United States Patent
Pieussergues et al.

(10) Patent No.: US 7,954,327 B2
(45) Date of Patent: Jun. 7, 2011

(54) CHAMBER ENDWALL, METHOD OF PRODUCING IT, COMBUSTION CHAMBER COMPRISING IT, AND TURBINE ENGINE EQUIPPED THEREWITH

(75) Inventors: Christophe Pieussergues, Nangis (FR); Denis Jean Maurice Sandelis, Nangis (FR)

(73) Assignee: SNECMA, Paris (FR)

( * ) Notice: Subject to any disclaimer, the term of this patent is extended or adjusted under 35 U.S.C. 154(b) by 794 days.

(21) Appl. No.: 11/945,580

(22) Filed: Nov. 27, 2007

(65) Prior Publication Data
US 2008/0134661 A1 Jun. 12, 2008

(30) Foreign Application Priority Data
Dec. 7, 2006 (FR) ........................ 0655377

(51) Int. Cl.
F02C 1/00 (2006.01)
H02G 3/00 (2006.01)
(52) U.S. Cl. ................. 60/756; 60/752; 60/804
(58) Field of Classification Search ......... 60/752, 60/754, 755, 756, 757, 758, 759, 760, 804
See application file for complete search history.

(56) References Cited

U.S. PATENT DOCUMENTS

| | | | |
|---|---|---|---|
| 4,454,711 A | 6/1984 | Ben-Porat | |
| 4,567,730 A * | 2/1986 | Scott | 60/757 |
| 4,843,825 A * | 7/1989 | Clark | 60/756 |
| 5,956,955 A * | 9/1999 | Schmid | 60/748 |
| 6,070,830 A | 6/2000 | Mueller et al. | |
| 6,438,958 B1 * | 8/2002 | McCaffrey et al. | 60/752 |
| 6,557,349 B1 * | 5/2003 | Young et al. | 60/752 |
| 7,665,306 B2 * | 2/2010 | Bronson et al. | 60/752 |
| 7,730,725 B2 * | 6/2010 | Faulder et al. | 60/752 |
| 7,757,495 B2 * | 7/2010 | Bessagnet et al. | 60/800 |
| 7,770,398 B2 * | 8/2010 | De Sousa et al. | 60/752 |
| 2005/0178126 A1 * | 8/2005 | Young et al. | 60/747 |
| 2006/0037322 A1 * | 2/2006 | Burd et al. | 60/752 |
| 2007/0256418 A1 * | 11/2007 | Mueller et al. | 60/752 |
| 2010/0095680 A1 * | 4/2010 | Rudrapatna et al. | 60/754 |
| 2010/0229562 A1 * | 9/2010 | Zupanc et al. | 60/751 |

FOREIGN PATENT DOCUMENTS

| | | |
|---|---|---|
| EP | 0 564 171 A1 | 10/1993 |
| EP | 1 271 059 A2 | 1/2003 |
| EP | 1 746 348 A2 | 1/2007 |
| FR | 1.124.336 | 10/1956 |
| FR | 2 673 454 A1 | 9/1992 |

OTHER PUBLICATIONS

U.S. Appl. No. 12/199,182, filed Aug. 27, 2008, Pieussergues, et al.

* cited by examiner

Primary Examiner — William H Rodríguez
(74) Attorney, Agent, or Firm — Oblon, Spivak, McClelland, Maier & Neustadt, L.L.P.

(57) ABSTRACT

A combustion chamber which includes a chamber endwall which takes the form of a substantially frustoconical component including a succession of adjacent planar portions is disclosed. The invention can be applied to a combustion chamber of a turbine engine.

18 Claims, 3 Drawing Sheets

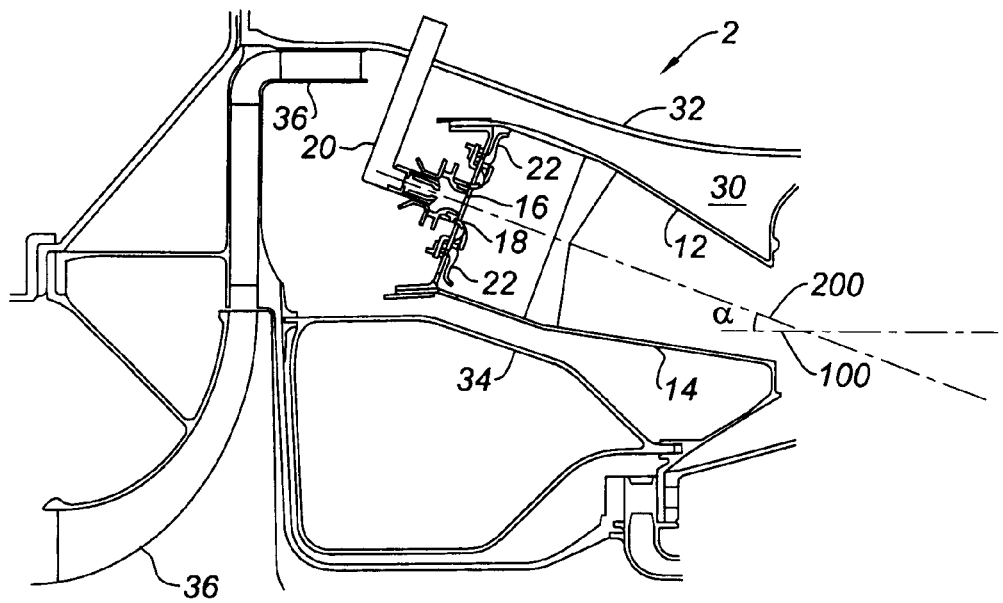
Fig. 1
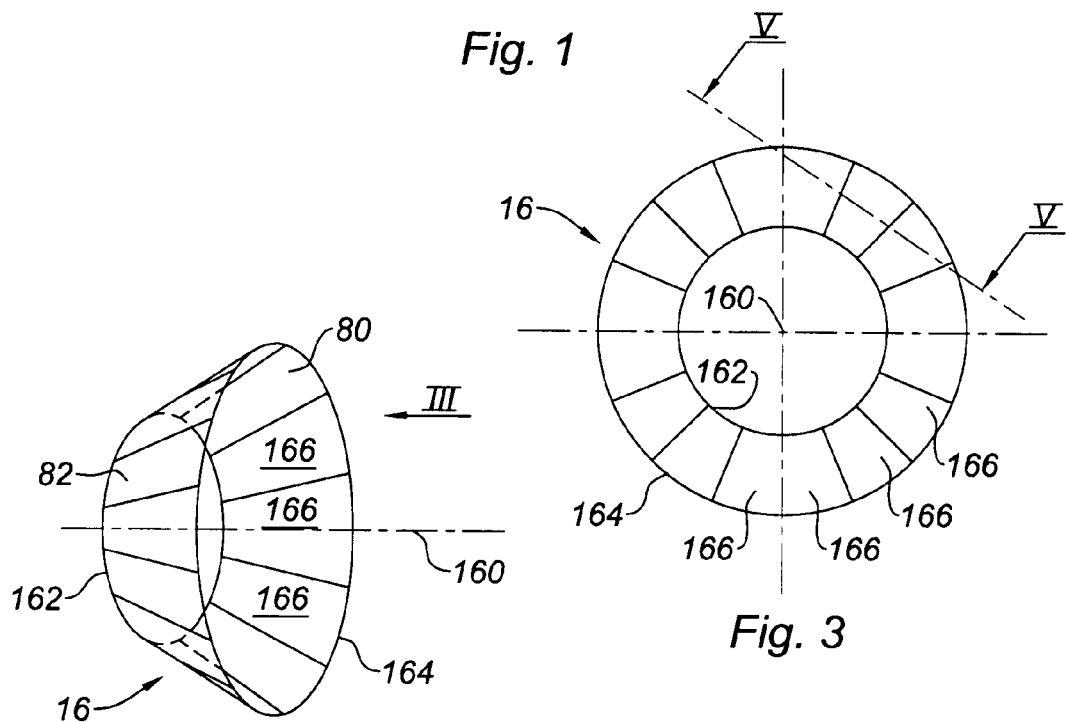
Fig. 2
Fig. 3
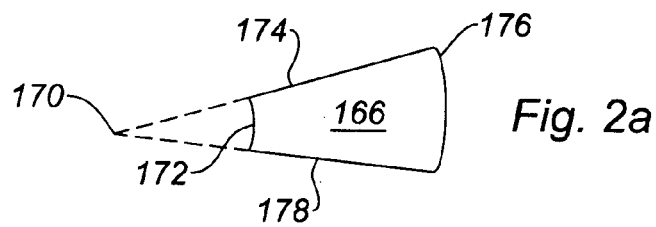
Fig. 2a

CHAMBER ENDWALL, METHOD OF PRODUCING IT, COMBUSTION CHAMBER COMPRISING IT, AND TURBINE ENGINE EQUIPPED THEREWITH

BACKGROUND OF THE INVENTION AND DESCRIPTION OF THE PRIOR ART

The present invention relates to the technical field of combustion chambers for turbine engines. It is aimed in particular at a combustion chamber and at a method of producing the chamber endwall. It is finally aimed at a turbine engine equipped with such a combustion chamber.

Throughout the following, the terms "axial", "radial" and "transverse" correspond respectively to an axial direction, a radial direction and a transverse plane of the turbine engine respectively, and the terms "upstream" and "downstream" correspond to the direction of gas flow in the turbine engine respectively.

A conventional combustion chamber is illustrated in FIG. 6, which is an axial section showing one half of the combustion chamber, the other half thereof being derived by symmetry with respect to the axis of the turbine engine (not shown). The combustion chamber 110 is contained within a diffusion chamber 130 which is an annular space defined between an external casing 132 and an internal casing 134, into which space is introduced a compressed oxidant originating upstream from a compressor (not shown) by way of an annular diffusion duct 136.

This conventional combustion chamber 110 comprises an external wall 112 and an internal wall 114 which are coaxial and substantially conical and which widen out from upstream to downstream with a cone angle α substantially ranging between 10 and 12 degrees. The external 112 and internal 114 walls of the combustion chamber 110 are connected to one another toward the upstream end of the combustion chamber by a chamber endwall 116.

The chamber endwall 116 is a frustoconical annular component which extends between two substantially transverse planes while widening out from downstream to upstream. The chamber endwall 116 is connected to each of the two external 112 and internal 114 walls of the combustion chamber 110. Owing to the small inclination of the combustion chamber 110, the chamber endwall 116 has a small conical taper. It is provided with injection openings 118 through which pass injection systems 120 which introduce fuel at the upstream end of the combustion chamber 110 where the combustion reactions take place.

These combustion reactions have the effect of radiating heat from downstream to upstream in the direction of the chamber endwall 116. In order to prevent this chamber endwall 116 from being damaged due to the heat, thermal protection shields, also termed deflectors 122, are provided. These deflectors 122 are substantially flat plates which are fastened by brazing to the chamber endwall 116. They are cooled by means of jets of cooling air which enter the combustion chamber 110 through cooling orifices 124 drilled in the chamber endwall 116. These jets of air, which flow from upstream to downstream, are guided by chamber fairings 126, cross the chamber endwall 116 through the cooling orifices, and impact on an upstream face of the deflectors 122.

In turbine engine designs in which the outlet of the high-pressure compressor is centrifugal, the mean diameter at the high-pressure compressor outlet is greater than the mean diameter at the high-pressure turbine inlet. The external and internal walls of the combustion chamber are therefore inclined by widening out from downstream to upstream, and not from upstream to downstream as with the conventional combustion chambers described above, with a cone angle substantially ranging between 25 and 35 degrees.

Such a large inclination of the combustion chamber has repercussions on the conical taper of the chamber endwall and on the position of the deflectors with respect to the chamber endwall. Such a combustion chamber is partially illustrated in FIG. 7, in axial section. This figure shows an axial direction 100 parallel to the axis of the turbine engine, the main direction 200 of the combustion chamber 110, and the angle α between these two axes 100, 200. Owing to the large inclination of the combustion chamber 110, the chamber endwall 116 has a larger conical taper than a conventional combustion chamber endwall. That affects the distance D between the chamber endwall with a large conical taper and the planar deflectors. In the plane of the axial section shown in FIG. 7, the distance D between the chamber endwall 116 and the deflectors 122 appears to be constant. However, as illustrated in FIG. 8, which is a section on the plane VIII-VIII in FIG. 7, this distance D diminishes as it extends over a circumferential generatrix of the chamber endwall 116, to a point such that the chamber endwall 116 and the deflectors 122 come into contact. Such a contact between these components is detrimental to a correct assembly of the deflectors in the combustion chamber. As a result, the cooling of the chamber endwall 116 by the deflectors 122 is not performed correctly.

SUMMARY OF THE INVENTION

The object of the invention is to overcome these disadvantages, and the invention provides a combustion chamber of a turbine engine of which the chamber endwall is configured such that the distance D between the chamber endwall and the deflectors remains constant.

The combustion chamber, being an annular component bounded by an external wall and an internal wall, said external and internal walls being frustoconical, and said external and internal walls being connected upstream by a wall constituting said chamber endwall, the combustion chamber being provided with a plurality of deflectors taking the form of flat plates which are fastened to a face of said chamber endwall that faces the inside of the combustion chamber, is distinguished in that said chamber endwall, which widens out from upstream to downstream, takes the form of a substantially frustoconical component consisting of a succession of adjacent planar portions.

Each planar portion has a contour lying on an angular sector, of which two sides are straight line segments originating from the same center.

Preferably, said planar portion contour possesses four sides, of which two sides are concentric circular arcs having the same center and of which the other two sides are straight line segments originating from said center and connecting these two circular arcs.

Each planar portion has a contour having four sides and lying on an angular sector, of which two sides are concentric circular arcs having the same center and of which the other two sides are straight line segments originating from the same center and connecting these two circular arcs.

At least one of said planar portions is traversed by an injection opening.

Furthermore, the chamber endwall comprises ribs which extend radially between said planar portions. In addition, the chamber endwall comprises cooling orifices along said ribs. Preferably, said cooling orifices extend along two lines arranged on each side of each rib.

According to a second aspect, the invention relates to a method of producing a chamber endwall according to the first aspect of the invention, which comprises at least one stamping operation which deforms an initially planar chamber endwall so as to produce planar portions.

Furthermore, the method comprises at least one drilling operation to produce an injection opening through at least one planar portion.

In addition, said stamping operation produces ribs between said planar portions.

Furthermore, the method comprises at least one drilling operation to produce cooling orifices along said ribs.

According to a third aspect, the invention relates to a combustion chamber comprising a chamber endwall with deflectors taking the form of substantially flat plates, the number of said deflectors being equal to the number of planar portions of the chamber endwall, and each deflector being fastened to one of said planar portions on a face which faces the inside of said combustion chamber.

Preferably, said deflectors comprise lateral rims intended to cooperate with said ribs to prevent lateral leaks.

According to a fourth aspect, the invention relates to a turbine engine equipped with a combustion chamber according to the first aspect.

The invention offers the advantage that it is possible to keep the distance D between the chamber endwall and the deflectors constant by using planar deflectors similar to those of the chamber endwalls of the conventional combustion chambers, thereby not generating additional costs associated with the manufacture of deflectors having a complex geometry.

BRIEF DESCRIPTION OF THE DRAWINGS

The invention will be better understood on reading the detailed description below of one particular embodiment of the invention given by way of nonlimiting indication and illustrated by means of the appended drawings, in which:

FIG. 1 is a view in axial section of part of a turbine engine of which the combustion chamber has a large inclination, showing one half of the combustion chamber, the other half being derived by axial symmetry;

FIG. 2 represents a schematically illustrated chamber endwall, seen in perspective;

FIG. 2a represents a planar portion of the chamber endwall in a top view;

FIG. 3 represents the chamber endwall schematically illustrated in FIG. 2, in a plan view and seen from the downstream end in the direction of the arrow III in FIG. 2;

DESCRIPTION OF THE PREFERRED EMBODIMENTS

Figure 4:
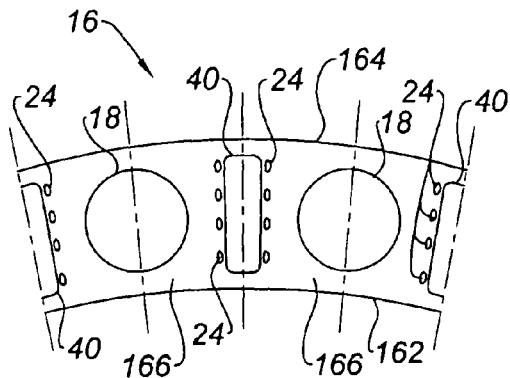
FIG. 4 is a more realistic plan view of part of the chamber endwall schematically illustrated in FIG. 3, in a plan view and seen from the downstream end.

With reference first of all to FIG. 1, there is represented a portion of a turbine engine 2 extending in an axial direction 100 and equipped with a combustion chamber 10 and having a centrifugal high-pressure compressor outlet. This combustion chamber 10 comprises an external wall 12 and an internal wall 14 which are coaxial and substantially frustoconical and which widen out from downstream to upstream with a cone angle α substantially ranging between 25 and 35 degrees.

The combustion chamber 10 is contained within a diffusion chamber 30 which is an annular space defined between an external casing 32 and an internal casing 34, into which space is introduced a compressed oxidant originating upstream from a compressor (not shown) by way of an annular diffusion duct 36. Owing to the inclination of the combustion chamber 10, the upstream end thereof is situated radially more to the outside than the downstream end thereof.

The external 12 and internal 14 walls of the combustion chamber 10 are connected to one another toward the upstream end of the combustion chamber by a chamber endwall 16, which is a substantially annular and frustoconical component extending between two substantially transverse planes while widening out from upstream to downstream. The chamber endwall 16 is connected to each of these two external 12 and internal 14 walls of the combustion chamber 10. It is provided with injection openings 18 through which there pass injection systems 20 which traverse the outer casing 32 and which introduce fuel at the upstream end of the combustion chamber 10 where the combustion reactions take place.

FIG. 2 represents, schematically and in perspective, a chamber endwall 16, which is a substantially frustoconical component whose axis 160 is coincident, in service, with the axis of the turbine engine. The chamber endwall 16 has an upstream edge 162 and a downstream edge 164. It widens out from the upstream edge 162 toward the downstream edge 164. It takes the form of a frustoconical envelope having an inner face 80 and an outer face 82. The body of the chamber endwall is not continuously curved, but has successive and adjacent planar portions 166, or facets. A planar portion 166 is represented in FIG. 2a in a top view. It possesses a contour having four sides 172, 174, 176, 178 which lies on an angular sector originating from a point 170. Two of the sides 172, 176 are concentric circular arcs centered on the point 170. The other two sides 174, 178 are straight line segments originating from the point 170 and lying on the angular sector, these segments connecting the two circular arcs 172, 176.

FIG. 3 is a schematic representation of the same chamber endwall 16, seen in plan view from the downstream end, as indicated by the arrow III in FIG. 2. This view shows the planar portions 166, which are uniformly distributed over the body of the chamber endwall 16 between its upstream edge 162 and its downstream edge 164.

FIG. 4 is a part view analogous to FIG. 3 showing a more realistic representation of part of a chamber endwall 16 as seen in plan view from the downstream end. The chamber endwall comprises injection openings 18 formed through each of the planar portions 166. These injection openings 18 have the function of letting through the injection systems 20 already described with reference to FIG. 1. Each injection opening 18 is substantially centered on the corresponding planar portion 166. At the junction between two adjacent planar portions 166, the chamber endwall 16 comprises ribs 40 which extend from its upstream edge 162 to its downstream edge 164 in a substantially rectilinear direction perpendicular to said edges 162, 164. These ribs 40 form recesses on the inner face 80 of the chamber endwall 16 and bosses on its outer face 82. In the example illustrated, the ribs 40 have a substantially rectangular shape and have a relatively small thickness which can vary from 0 to 2 or 3 mm. They do not extend as far as each of the two upstream 162 and downstream 164 edges, but stop a short way in front of them, at a distance substantially ranging between 0.5 and 2 mm. Along the ribs 40, the chamber endwall 16 comprises cooling orifices 24 whose function will be described in more detail below. In the example illustrated, the cooling orifices 24 are aligned on either side of each rib 40 and there are four of them on each side of each rib 40.

Figure 5:
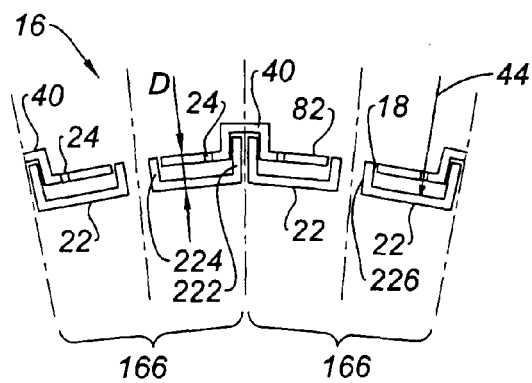
FIG. 5 is a section of this part of the chamber endwall shown in FIG. 4, seen in section on the plane V-V in FIG. 3.
Figure 6:
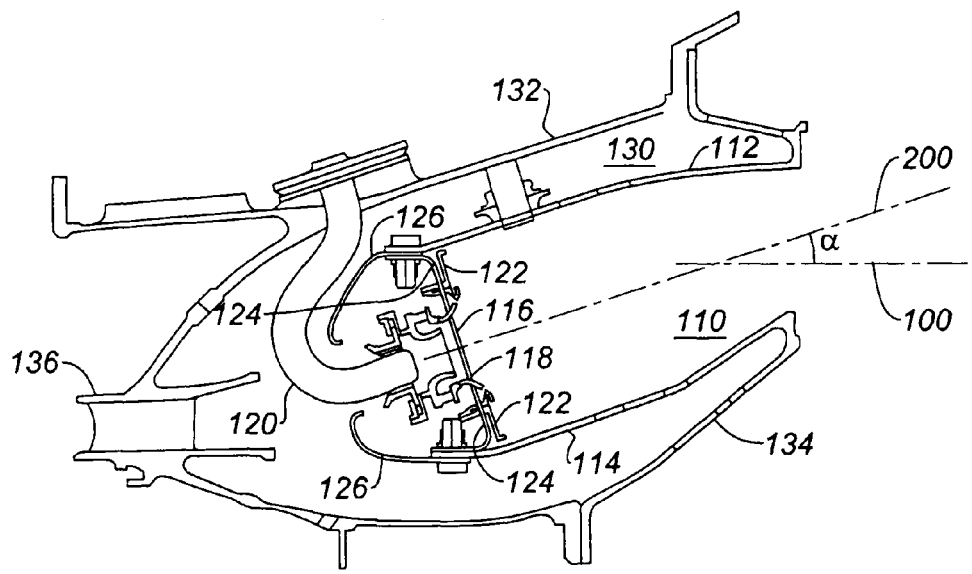
FIG. 6, already described, is a view in axial section of a prior art combustion chamber having a small inclination.
Figure 7:
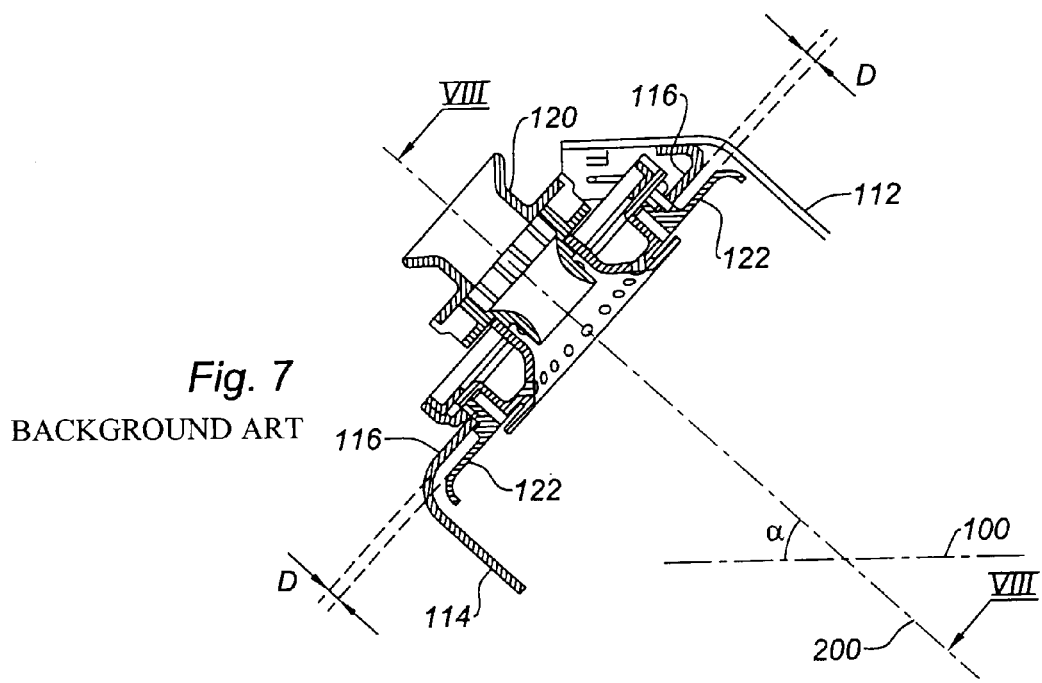
FIG. 7, already described, represents, on a larger scale, part of the prior art combustion chamber having a large inclination, seen in axial section.
Figure 8:
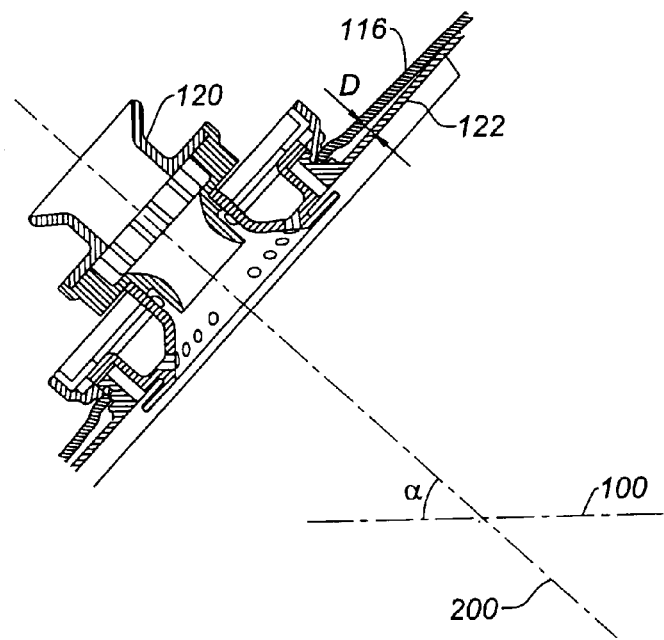
FIG. 8, already described, represents, on a larger scale, part of the prior art combustion chamber having a large inclination, seen in section in the direction of the arrows VIII-VIII in FIG. 7.

FIG. 5 is a view of the chamber endwall 16 in section on the plane V-V in FIG. 3. This view shows the planar portions 166 and, at the junction between them, the bosses formed by the ribs 40 on the outer face 82 of the chamber endwall 16. On each side of each rib 40 appear the cooling orifices 24 which are formed through the planar portions 166. FIG. 5 also shows deflectors 22, which are substantially flat plates fastened to the chamber endwall 16. These deflectors comprise lateral rims 222 which each engage in one of the two ribs 40 which border the planar portion 166 receiving the deflector 22. The cooperation between these lateral rims 222 and said ribs 40 makes it possible to prevent any lateral leaks. Each deflector 22 also comprises a substantially central hole 226 which is situated facing the injection opening 18 in the planar portion 166 receiving this deflector 22, in order to let through the corresponding injection system 20 (see FIG. 1). In the example illustrated, these central holes 226 are holes having raised edges 224. The deflectors 22 are preferably fastened to the chamber endwall 16 by brazing at the central holes 226.

With such a configuration, the distance D which separates each deflector 22 from the planar portion 166 which receives it remains constant, and the deflectors 22 can be cooled in a satisfactory manner. The cooling is depicted at the right-hand side of FIG. 5 by an arrow 44 which represents a jet of air which originates from upstream and passes through the cooling orifices 24 of a planar portion 166 of the chamber endwall 16 so as to impact on the deflector 22 fastened to this planar portion 166.

The production of the chamber endwall 16 according to the invention involves at least one pressure deformation operation and a number of drilling operations. The starting point is an axisymmetric frustoconical part which is deformed by a stamping operation so as to convert the body of the truncated cone into a succession of mutually adjacent planar portions. During this stamping operation, ribs are also produced between the planar portions.

This is followed by drilling operations which involve drilling injection openings substantially at the center of each planar portion, and drilling cooling orifices which are distributed in each planar portion and along each rib. Preferably, the cooling orifices are drilled on each side of each rib. The number and the positions of the cooling orifices are not limited.

The invention claimed is:

1. An annular combustion chamber of a turbine engine, comprising:
    an external wall and an internal wall, said external and internal walls being frustoconical; and
    a chamber endwall connected to upstream ends of said external wall and said internal wall, said chamber endwall including a plurality of deflectors taking the form of flat plates fastened to a face of said chamber endwall that faces the inside of the combustion chamber,
    wherein said chamber endwall is a substantially frustoconical component which widens from upstream to downstream such that a radius of a downstream edge is greater than a radius of an upstream edge and includes a succession of adjacent planar portions, and
    wherein said chamber endwall comprises ribs provided at every junction between adjacent planar portions, said ribs extend upstream to downstream and cooperate with said deflectors.

2. The combustion chamber as claimed in claim 1, wherein each planar portion of the chamber endwall has a contour lying on an angular sector, of which two sides are straight line segments originating from the same upstream center.

3. The combustion chamber as claimed in claim 2, wherein said planar portion contour includes four sides, of which two sides are concentric circular arcs having the same center and of which the other two sides are said straight line segments originating from said center and connect said two circular arcs.

4. The combustion chamber as claimed in claim 1, wherein at least one of said planar portions is traversed by an injection opening.

5. The combustion chamber as claimed in claim 4, wherein said deflectors include a central hole which faces said injection opening.

6. The combustion chamber as claimed in claim 5, wherein said central hole includes raised edges.

7. The combustion chamber as claimed in claim 5, wherein said deflectors are fastened to said chamber endwall by brazing at said central hole.

8. The combustion chamber as claimed in claim 1, comprising cooling orifices along said ribs.

9. The combustion chamber as claimed in claim 8, wherein said cooling orifices extend along two radial lines arranged on each side of each rib.

10. A method of producing a combustion chamber as claimed in claim 1, comprises comprising at least one stamping operation which deforms an initially planar chamber endwall so as to produce planar portions.

11. The method as claimed in claim 10, which comprises at least one drilling operation to produce an injection opening through at least one planar portion.

12. The method as claimed in claim 10, wherein said stamping operation produces ribs between said planar portions.

13. The method as claimed in claim 12, which comprises at least one drilling operation to produce cooling orifices along said ribs.

14. A combustion chamber as claimed in claim 1, which comprises deflectors taking the form of substantially flat plates, the number of said deflectors being equal to the number of planar portions of the chamber endwall, and wherein each deflector is fastened to one of said planar portions on a face which faces the inside of said combustion chamber.

15. The combustion chamber as claimed in claim 14, wherein said deflectors comprise lateral rims cooperating with said ribs to prevent lateral leaks.

16. A turbine engine which comprises a combustion chamber as claimed in claim 1.

17. The combustion chamber as claimed in claim 1, wherein said ribs form recesses on an inner face of the planar portions and bosses on an outer face of the planar portions.

18. The combustion chamber as claimed in claim 17, wherein said deflectors include lateral rims which engage said recesses formed by said ribs.

* * * * *

UNITED STATES PATENT AND TRADEMARK OFFICE
CERTIFICATE OF CORRECTION

| | | |
|---|---|---|
| PATENT NO. | : 7,954,327 B2 | Page 1 of 1 |
| APPLICATION NO. | : 11/945580 | |
| DATED | : June 7, 2011 | |
| INVENTOR(S) | : Christophe Pieussergues et al. | |

It is certified that error appears in the above-identified patent and that said Letters Patent is hereby corrected as shown below:

Column 6, line 34, before "comprising" delete "comprises".

Signed and Sealed this
Sixteenth Day of August, 2011

David J. Kappos
*Director of the United States Patent and Trademark Office*